(12) United States Patent
Trost et al.

(10) Patent No.: US 7,426,947 B2
(45) Date of Patent: Sep. 23, 2008

(54) VENEER SLICER

(75) Inventors: Jürgen F. Trost, Canfield, OH (US); Wolfgang Lacroix, Pfalzgrafenweiler (DE)

(73) Assignee: Danzer North America, Inc., Wilmington, DE (US)

( * ) Notice: Subject to any disclaimer, the term of this patent is extended or adjusted under 35 U.S.C. 154(b) by 0 days.

(21) Appl. No.: 11/733,837

(22) Filed: Apr. 11, 2007

(65) Prior Publication Data

US 2007/0215244 A1 Sep. 20, 2007

Related U.S. Application Data

(62) Division of application No. 10/503,163, filed as application No. PCT/US03/02870 on Jan. 31, 2003.

(60) Provisional application No. 60/354,236, filed on Feb. 4, 2002.

(51) Int. Cl.
*B27M 1/00* (2006.01)
*B27L 5/00* (2006.01)

(52) U.S. Cl. .................... 144/362; 144/178; 144/209.1; 144/214

(58) Field of Classification Search .............. 144/162.1, 144/178, 209.1, 214, 362, 211, 212
See application file for complete search history.

(56) References Cited

U.S. PATENT DOCUMENTS

| 674,562 A | 5/1901 | Kraus |
|---|---|---|
| 793,306 A | 6/1905 | Koss |
| 2,303,213 A | 11/1942 | Koss |
| 2,576,520 A | 11/1951 | Koss |
| 2,592,782 A | 4/1952 | Zweifel et al. |
| 2,676,627 A | 4/1954 | McFall |
| 3,441,069 A | 4/1969 | Koss |
| 3,654,973 A | 4/1972 | Koss |
| 3,680,612 A | 8/1972 | Hale |
| 3,750,725 A | 8/1973 | Cremona |
| 3,905,408 A | 9/1975 | Hale |
| 4,063,578 A | 12/1977 | Cremona |
| 4,068,693 A | 1/1978 | Cremona |
| 4,069,850 A | 1/1978 | Cremona |
| 4,083,391 A | 4/1978 | Cremona |
| 4,089,354 A | 5/1978 | Cremona |
| 4,102,372 A | 7/1978 | Cremona |
| 4,137,957 A | 2/1979 | Cremona |
| 4,287,462 A | 9/1981 | Beck et al. |

(Continued)

FOREIGN PATENT DOCUMENTS

CA 1 204 985 5/1986

(Continued)

OTHER PUBLICATIONS

PCT International Search Report form 1503 for PCT/US03/02870.

*Primary Examiner*—Shelley Self
(74) *Attorney, Agent, or Firm*—Barnes & Thornburg LLP

(57) ABSTRACT

A method and apparatus for converting a flitch into sheets of veneer. The method and apparatus include providing a drive mechanism which causes relative motion of a knife in contact with the flitch. The relative motion is relatively slower during one part of the cutting stroke and is relatively faster during another part of the cutting stroke.

21 Claims, 9 Drawing Sheets

U.S. PATENT DOCUMENTS

| | | |
|---|---|---|
| 4,392,519 A | 7/1983 | Calvert |
| 4,503,740 A | 3/1985 | Brand et al. |
| 4,503,896 A | 3/1985 | Brand |
| 4,587,616 A | 5/1986 | Weil |
| 4,601,317 A | 7/1986 | Brand |
| 4,753,278 A | 6/1988 | Lorenzo |
| 4,791,970 A | 12/1988 | Walser et al. |
| 4,831,747 A | 5/1989 | Roos et al. |
| 4,893,663 A | 1/1990 | Ely |
| 5,067,534 A | 11/1991 | Toivio |
| 5,101,874 A | 4/1992 | Weil |
| 5,143,129 A | 9/1992 | Toivio |
| 5,333,658 A | 8/1994 | Albion et al. |
| 5,381,841 A | 1/1995 | Weil |
| 5,383,504 A | 1/1995 | Cremona |
| 5,385,185 A | 1/1995 | Calvert |
| 5,452,220 A | 9/1995 | Ely |
| 5,490,548 A | 2/1996 | Puranen |
| 5,511,598 A | 4/1996 | Brand |
| 5,562,137 A | 10/1996 | Brand |
| 5,590,700 A | 1/1997 | Brand |
| 5,680,887 A | 10/1997 | Brand |
| 5,868,187 A * | 2/1999 | Brand ........................ 144/363 |
| 5,979,524 A | 11/1999 | Trost |
| 6,102,090 A | 8/2000 | Gruender et al. |
| 7,025,099 B1 | 4/2006 | Gruender et al. |

FOREIGN PATENT DOCUMENTS

| | | |
|---|---|---|
| DE | 25 01 936 B1 | 1/1976 |
| DE | 25 23 481 A | 5/1976 |
| DE | 25 23 482 A | 5/1976 |
| DE | 25 40 992 B1 | 10/1976 |
| DE | 39 15 516 A1 | 11/1989 |
| DE | 3928941 A1 | 3/1990 |
| EP | 0 101 863 A1 | 3/1984 |
| IT | 1084683 | 5/1985 |
| IT | 1126371 | 5/1986 |

* cited by examiner

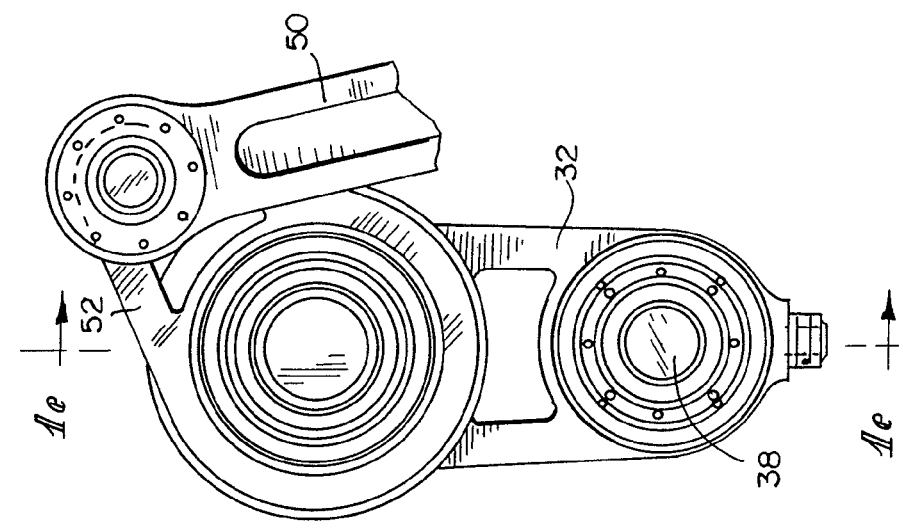
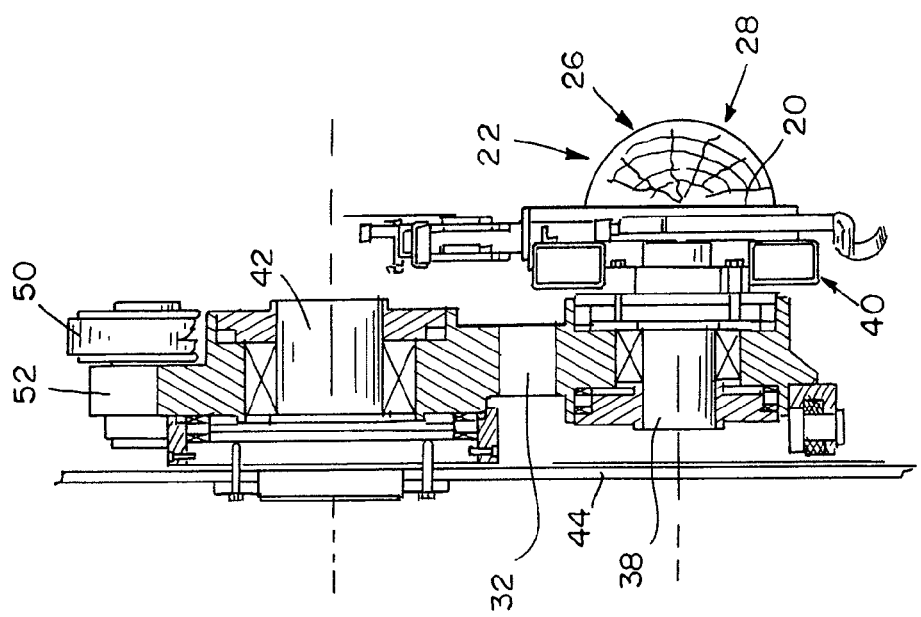

VENEER SLICER

CROSS REFERENCE TO RELATED APPLICATIONS

This application is a continuation of U.S. Ser. No. 10/503,163 filed Jul. 30, 2004. U.S. Ser. No. 10/503,163 is the U.S. national phase of PCT/US03/02870 filed Jan. 31, 2003. PCT/US03/02870 is a regular utility patent application claiming the benefit of the filing date of U.S. Ser. No. 60/354,236 filed Feb. 4, 2002. The filing dates of U.S. Ser. No. 10/503,163, PCT/US03/02870 and U.S. Ser. No. 60/354,236 are hereby claimed.

FIELD OF THE INVENTION

This invention is disclosed in the context of machinery for the manufacture of wood veneers, but is believed to have other applications as well.

BACKGROUND OF THE INVENTION

There are several known types of machines for the production of wood veneers. There are, for example, the machines illustrated and described in U.S. Pat. Nos. 2,576,520; 2,676,627; 3,441,069; 3,654,973; 3,680,612; 3,750,725; 4,063,578; 4,068,693; 4,069,850; 4,083,391; 4,089,354; 4,102,372; 4,137,957; 4,287,462; 4,392,519; 4,503,740; 4,503,896; 4,587,616; 4,601,317; 4,753,278; 4,791,970; 4,831,747; 4,893,663; 5,067,534; 5,101,874; 5,143,129; 5,381,841; 5,383,504; 5,385,185; 5,452,220; 5,490,548; 5,511,598; 5,562,137; 5,590,700; 5,680,887; 5,979,524; and, 6,102,090; Canadian Patent 1,204,985; German Patent Specifications: 2,501,936; 2,523,481; 2,523,482; 3,915,516; 3,928,941; and, Italian Patent Specifications: 1,084,683 and 1,126,371. The disclosures of all of these references are hereby incorporated herein by reference. No representation is intended that this listing is a listing of all art material to the examination of this application, or that a thorough search of all relevant art has been conducted, or that no better art than that listed here exists. Nor should any such representation be inferred.

DISCLOSURE OF THE INVENTION

According to one aspect of the invention, a veneer slicer includes a knife, means for supporting a flitch, and means for causing relative motion of the knife and flitch. The means for causing relative motion of the knife and flitch slows the relative motion of the knife and flitch during one part of the cutting stroke and speeds up the relative motion of the knife and flitch during another part of the cutting stroke.

Illustratively according to this aspect of the invention, the means for supporting a flitch includes a flitch table. The means for causing relative motion of the knife and flitch includes a bell crank having a first arm and a second arm, a crankshaft, and a connecting rod coupling the first arm to the crankshaft. The second arm is coupled to the flitch table to move the flitch table non-linearly.

Further illustratively according to this aspect of the invention, the means for supporting a flitch includes a guide and a follower for following the guide.

Alternatively illustratively according to this aspect of the invention, the means for supporting a flitch includes a flitch table. The means for causing relative motion of the knife and flitch includes a guide and a follower for following the guide. One of the guide and follower is mounted on a supporting framework. The other of the guide and follower is mounted on a flitch table support to mount the flitch table support movably relative to the supporting framework. The flitch table is mounted from the flitch table support for movement relative to the flitch table support. Means are provided for moving the flitch table relative to the flitch table support.

Further illustratively according to this aspect of the invention, the means for moving the flitch table relative to the flitch table support includes a motor coupled between the flitch table support and the flitch table. Actuation of the motor moves the flitch table relative to the flitch table support.

Illustratively according to this aspect of the invention, the means for supporting a flitch includes a flitch table having a port for coupling to a vacuum source.

Alternatively or additionally illustratively according to this aspect of the invention, the means for supporting a flitch includes a flitch table including dogs actuable between flitch releasing orientations and flitch supporting orientations to mount a flitch to the flitch table.

Illustratively according to this aspect of the invention, the means for causing relative motion of the knife and flitch includes a carriage for supporting the knife for movement selectively toward and away from the flitch.

According to another aspect of the invention, a veneer slicer includes a knife, a mechanism for supporting a flitch, and a drive system for causing relative motion of the knife and flitch. The drive system slows the relative motion of the knife and flitch during one part of the cutting stroke and speeds up the relative motion of the knife and flitch during another part of the cutting stroke.

Illustratively according to this aspect of the invention, the flitch-supporting mechanism includes a flitch table and the drive system includes a bell crank having a first arm and a second arm, a crankshaft, and a connecting rod coupling the first arm to the crankshaft. The second arm is coupled to the flitch table to move the flitch table non-linearly.

Further illustratively according to this aspect of the invention, the flitch-supporting mechanism includes a guide and a follower for following the guide.

Alternatively illustratively according to this aspect of the invention, the flitch-supporting mechanism includes a flitch table and the drive system includes a guide and a follower for following the guide. One of the guide and follower is mounted on a supporting framework and the other of the guide and follower is mounted on a flitch table support to mount the flitch table support movably relative to the supporting framework. The flitch table is mounted from the flitch table support for movement relative to the flitch table support. The drive system also moves the flitch table relative to the flitch table support.

Illustratively according to this aspect of the invention, the flitch-supporting mechanism includes a flitch table having a port for coupling to a vacuum source.

Alternatively or additionally illustratively according to this aspect of the invention, the flitch-supporting mechanism includes a flitch table including dogs actuable between flitch releasing orientations and flitch supporting orientations to mount a flitch to the flitch table.

Illustratively according to this aspect of the invention, the drive system includes a carriage for supporting the knife for movement selectively toward and away from the flitch.

Illustratively according to both of these aspects of the invention, the guide and follower include an arcuate track and a slide for following the track. The track has the same radius of curvature as an effective radius of the second arm.

Further illustratively according to both of these aspects of the invention, the length of the arcuate track is about a quarter of a circle.

Illustratively according to both of these aspects of the invention, the slide includes a solid bearing slide.

Alternatively illustratively according to both of these aspects of the invention, the slide includes ball bearings.

Further illustratively according to both of these aspects of the invention, the ball bearings are circulating type ball bearings.

Alternatively illustratively according to both of these aspects of the invention, the slide includes roller bearings.

Illustratively according to both of these aspects of the invention, the roller bearings are circulating type roller bearings.

Further illustratively according to both of these aspects of the invention, the guide and follower together include a solid bearing slide.

Alternatively illustratively according to both of these aspects of the invention, the guide and follower together include a slide and bearings.

Illustratively according to both of these aspects of the invention, the bearings are circulating bearings.

Further illustratively according to both of these aspects of the invention, the bearings are ball bearings.

Alternatively illustratively according to both of these aspects of the invention, the bearings are roller bearings.

Further illustratively according to both of these aspects of the invention, the apparatus includes a controller for controlling the motor in accordance with an algorithm.

Illustratively according to both of these aspects of the invention, the motor includes a fluid motor.

Alternatively illustratively according to both of these aspects of the invention, the motor includes an electric motor.

According to yet another aspect of the invention, a method of converting a flitch into sheets of veneer includes causing relative motion of a knife in contact with the flitch. The relative motion is relatively slower during one part of the cutting stroke and is relatively faster during another part of the cutting stroke.

Illustratively according to this aspect of the invention, causing relative motion includes providing a bell crank having a first arm and a second arm, providing a crankshaft, coupling the first arm to the crankshaft, and coupling the second arm to the flitch table.

Illustratively according to this aspect of the invention, causing relative motion includes providing a guide and a follower for following the guide.

Illustratively according to this aspect of the invention, providing a guide and a follower for following the guide include providing an arcuate track and a slide for following the track. The track has the same radius of curvature as an effective radius of the second arm.

Illustratively according to this aspect of the invention, providing an arcuate track includes providing an arcuate track having a length of about a quarter of a circle.

Illustratively according to this aspect of the invention, providing a slide includes providing a solid bearing slide.

Alternatively illustratively according to this aspect of the invention, providing a slide includes providing a ball bearing slide.

Illustratively according to this aspect of the invention, providing a ball bearing slide includes providing a circulating-type ball bearing slide.

Alternatively illustratively according to this aspect of the invention, providing a slide includes providing a roller bearing slide.

Illustratively according to this aspect of the invention, providing a roller bearing slide includes providing a circulating-type roller bearing slide.

Alternatively illustratively according to this aspect of the invention, causing relative motion includes providing a guide and a follower for following the guide. One of the guide and follower is mounted on a supporting framework. The other of the guide and follower is mounted on a flitch table support to mount the flitch table support movably relative to the supporting framework. The flitch table is mounted from the flitch table support for movement relative to the flitch table support. The flitch table is moved relative to the flitch table support.

Illustratively according to this aspect of the invention, providing a guide and a follower for following the guide together include providing a solid bearing slide.

Alternatively illustratively according to this aspect of the invention, providing a guide and a follower for following the guide together include providing a slide and bearings.

Illustratively according to this aspect of the invention, providing a slide and bearings together include providing circulating bearings.

Illustratively according to this aspect of the invention, providing circulating bearings includes providing circulating ball bearings.

Alternatively illustratively according to this aspect of the invention, providing circulating bearings includes providing circulating roller bearings.

Illustratively according to this aspect of the invention, moving the flitch table relative to the flitch table support includes coupling a motor between the flitch table support and the flitch table and actuating the motor to move the flitch table relative to the flitch table support.

Illustratively according to this aspect of the invention, actuating the motor to move the flitch table relative to the flitch table support includes actuating the motor in accordance with an algorithm.

Illustratively according to this aspect of the invention, coupling a motor between the flitch table support and the flitch table includes coupling a fluid motor between the flitch table support and the flitch table.

Alternatively illustratively according to this aspect of the invention, coupling a motor between the flitch table support and the flitch table includes coupling an electric motor between the flitch table support and the flitch table.

Illustratively according to this aspect of the invention, causing relative motion includes supporting the flitch on a flitch table including a port, and coupling the port to a vacuum source.

Alternatively or additionally illustratively according to this aspect of the invention, causing relative motion includes supporting the flitch on a flitch table including dogs actuable between flitch releasing orientations and flitch supporting orientations to mount a flitch to the flitch table, and actuating the dogs to flitch supporting orientations to mount the flitch to the flitch table.

Illustratively according to this aspect of the invention, causing relative motion includes providing a carriage for supporting the knife for movement selectively toward and away from the flitch.

BRIEF DESCRIPTION OF THE DRAWINGS

The invention may best be understood by referring to the following detailed description of an illustrative embodiment of the invention, and the accompanying drawings. In the drawings:

FIG. 1b illustrates a fragmentary elevational view of a detail of the system illustrated in FIG. 1a;

FIG. 1d illustrates a fragmentary elevational view of a detail of the system illustrated in FIG. 1a;

FIG. 1e illustrates a sectional view of the detail illustrated in FIG. 1d, taken generally along section lines 1e-1e of FIG. 1d;

DETAILED DESCRIPTION OF ILLUSTRATIVE EMBODIMENTS

Figure 1A:
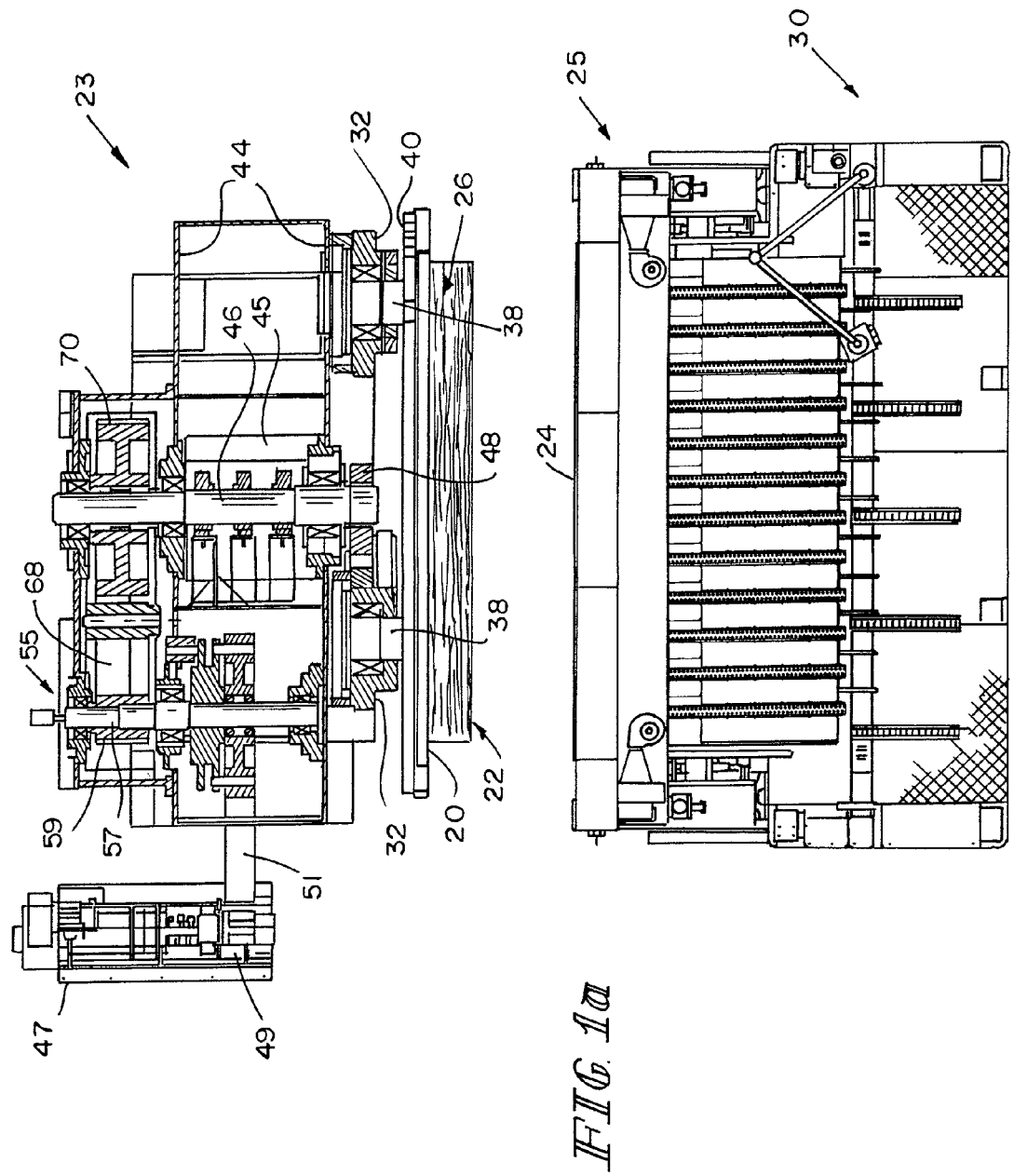
FIG. 1a illustrates a partial sectional top plan view of a system constructed according to the present invention.
Figure 1B:
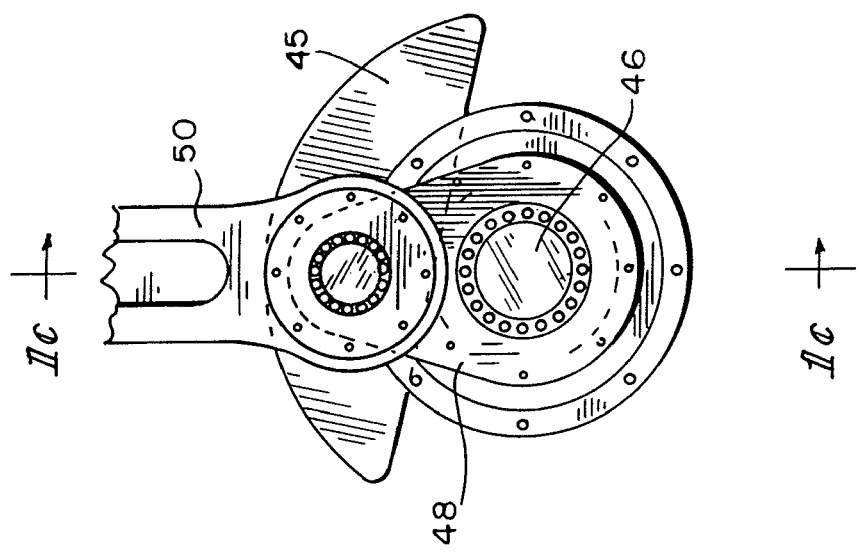
Figure 1C:
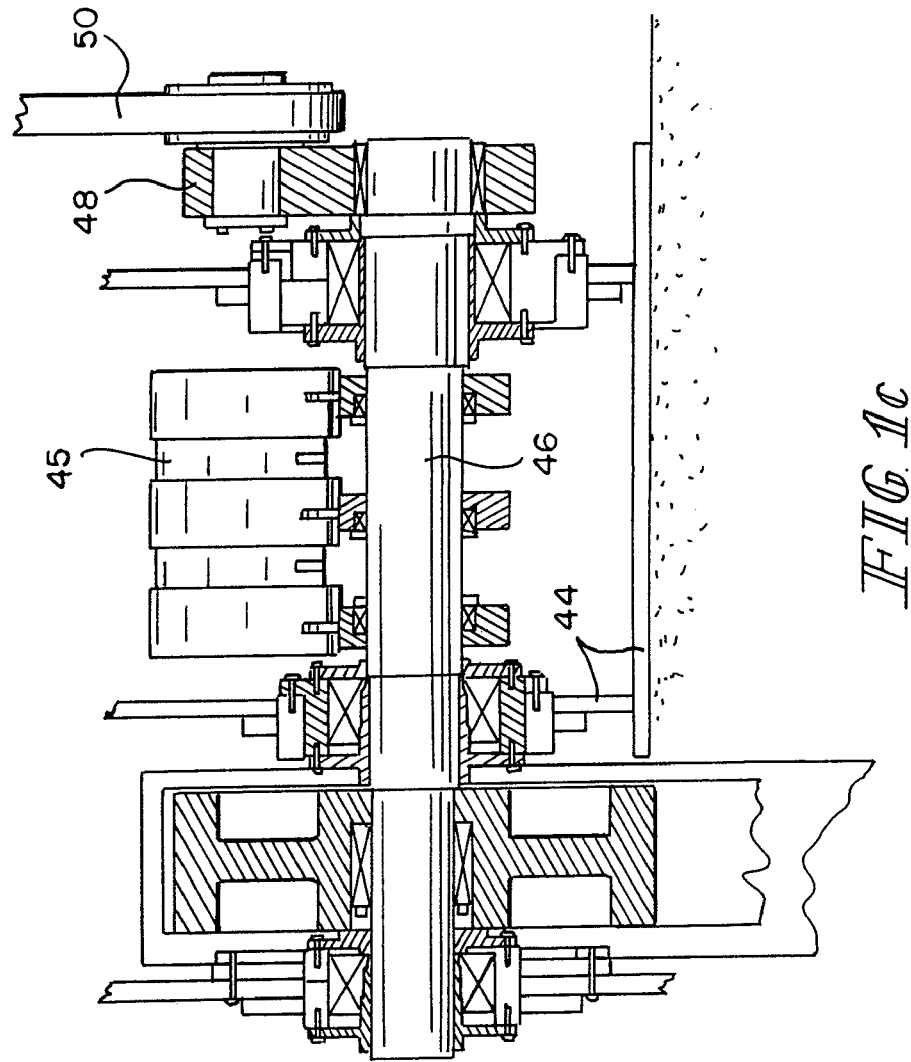
FIG. 1c illustrates a sectional view of the detail illustrated in FIG. 1b, taken generally along section lines 1c-1c of FIG. 1b.

Referring now to the drawings, a veneer slicer 23 includes a flitch table 20, for example, a vacuum-type or hydraulic dog-type flitch table, on which is mounted a flitch 22 which is to be sliced into veneer. The flitch 22 is sliced by moving it in contact with the cutting edge of a knife 24 in a cutting stroke. The knife 24 is mounted on, for example, a carriage 25 of the type illustrated and described in U.S. Pat. No. 5,979,524, which supports the knife 24 and a pressure bar. After completion of the cutting stroke, the flitch 22 and knife 24 are relatively retracted away from contact with each other, and returned to their relative positions for execution of the next cutting stroke. These cutting and return strokes are executed at a rate of, for example, 90 times a minute as the flitch 22 is converted to sheets of veneer.

In the past, the relative movement between the flitch 22 and knife 24 in veneer slicers of this type has always been linear. The present invention recognizes that a typical flitch 22 includes grain that generally runs relatively at least somewhat toward the knife 24 during the first half of the cutting stroke and generally relatively somewhat away from the knife 24 during the second half of the cutting stroke, owing to the way the wood of the typical flitch 22 has grown. As a result of this, the grain of the veneer sliced from the flitch 22 tends to be "rubbed up" and rougher on the half of each sheet of veneer sliced from a first half cut generally against the grain, for example, the upper half 26, of a typical flitch 22, and smoother on the half of each sheet of veneer sliced from a second half cut generally with the grain, for example, the lower half 28 of a typical flitch 22. That is, as the knife 24 proceeds "into" the flitch 22, the grain tends to be more rubbed up. As the knife 24 proceeds "out of" the flitch 22, the grain tends to be less rubbed up. This difference in surface smoothness can be visually detected by visual inspection of the sheets of veneer, and/or otherwise physically detected, for example, felt by rubbing the sheets of veneer as they come off the veneer slicer to the offbearers' station 30 to be, for example, stacked for further processing, for example, drying.

The present invention alleviates some of this difference in surface smoothness across the surface of the sliced sheet of veneer by slowing the relative motion of the knife 24 and flitch 22 during one part, for example, the first part, of the cutting stroke and speeding up the relative motion of the knife 24 and flitch 22 during another part, for example, the second part, of the cutting stroke. This is done in the embodiment illustrated in FIGS. 1a-e and 2-4 by mounting the flitch table 20 on (a) pivot arm(s) 32 to impart a rocking motion to the flitch table 20 rather than the prior art linear reciprocating motion. The flitch table 20 is rocked in such a way that each point 34 (FIG. 2) on the flitch table 20 and flitch 22 supported on the flitch table 20 moves along an arc 36 of a circle. In the illustrated embodiment, the arc 36's length is about a quarter of a circle. The radius of the circle is the effective radius (radii) of (a) flitch table motion arm(s) 32 by which the flitch table 20 is supported on the veneer slicer 23. Thus, during the first portion 26 of the slicing of a sheet of veneer from a typical flitch 22, when the cut is more against the grain of the flitch 22, the relative movement of the knife 24 and flitch 22 is more horizontal and the progress of the knife 24 through the flitch 22 thus slower. The relative movement of the knife 24 and flitch 22 becomes more vertical and the progress of the knife 24 through the flitch 22 faster as the cutting of a slice of veneer from the typical flitch 22 progresses, for example, during the cutting of portion 28.

Figure 2:
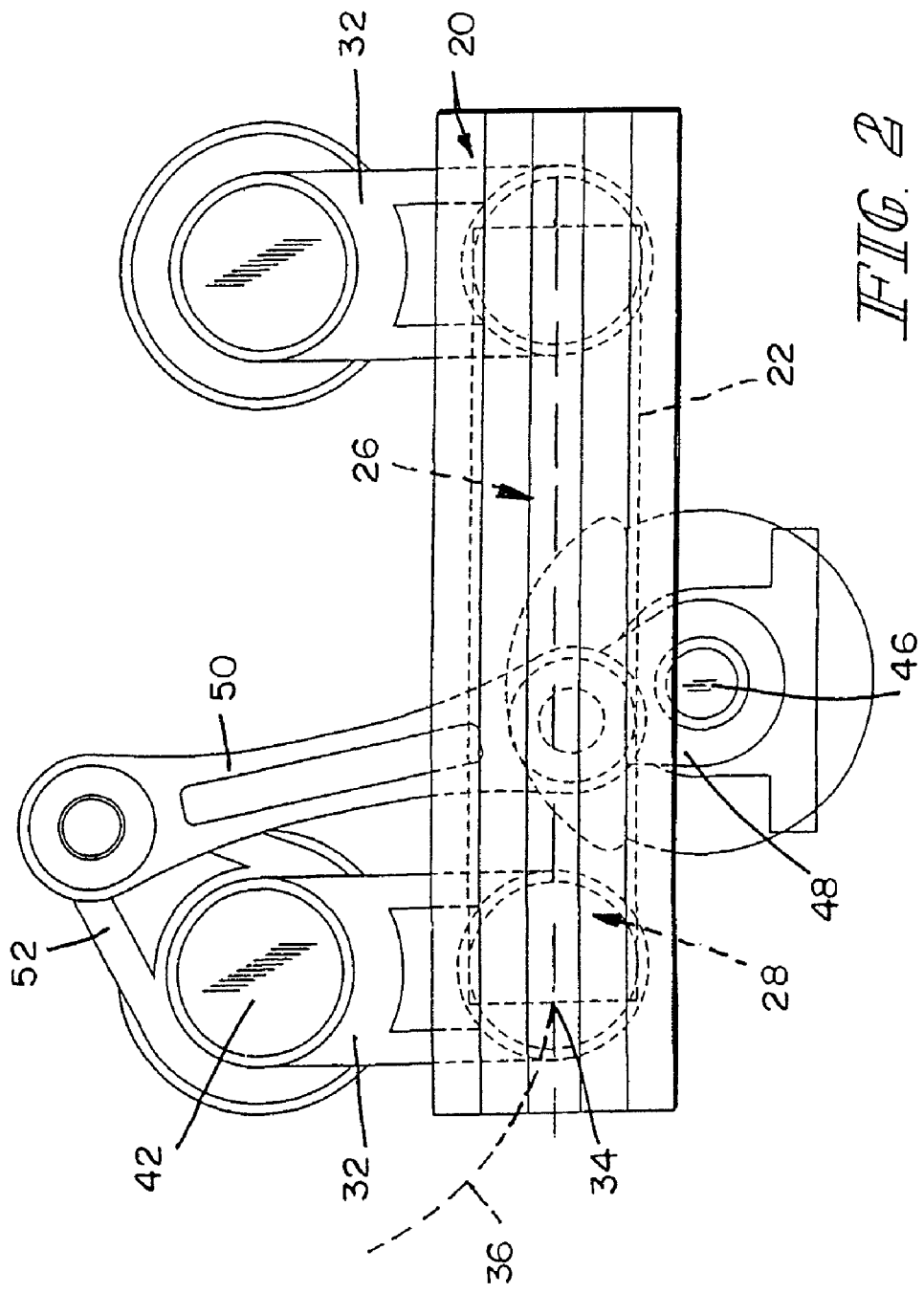
FIGS. 2-4 illustrate elevational views of certain components of the system illustrated in FIG. 1, in various orientations the illustrated components assume during each cycle of operation of the system illustrated in FIG. 1.
Figure 3:
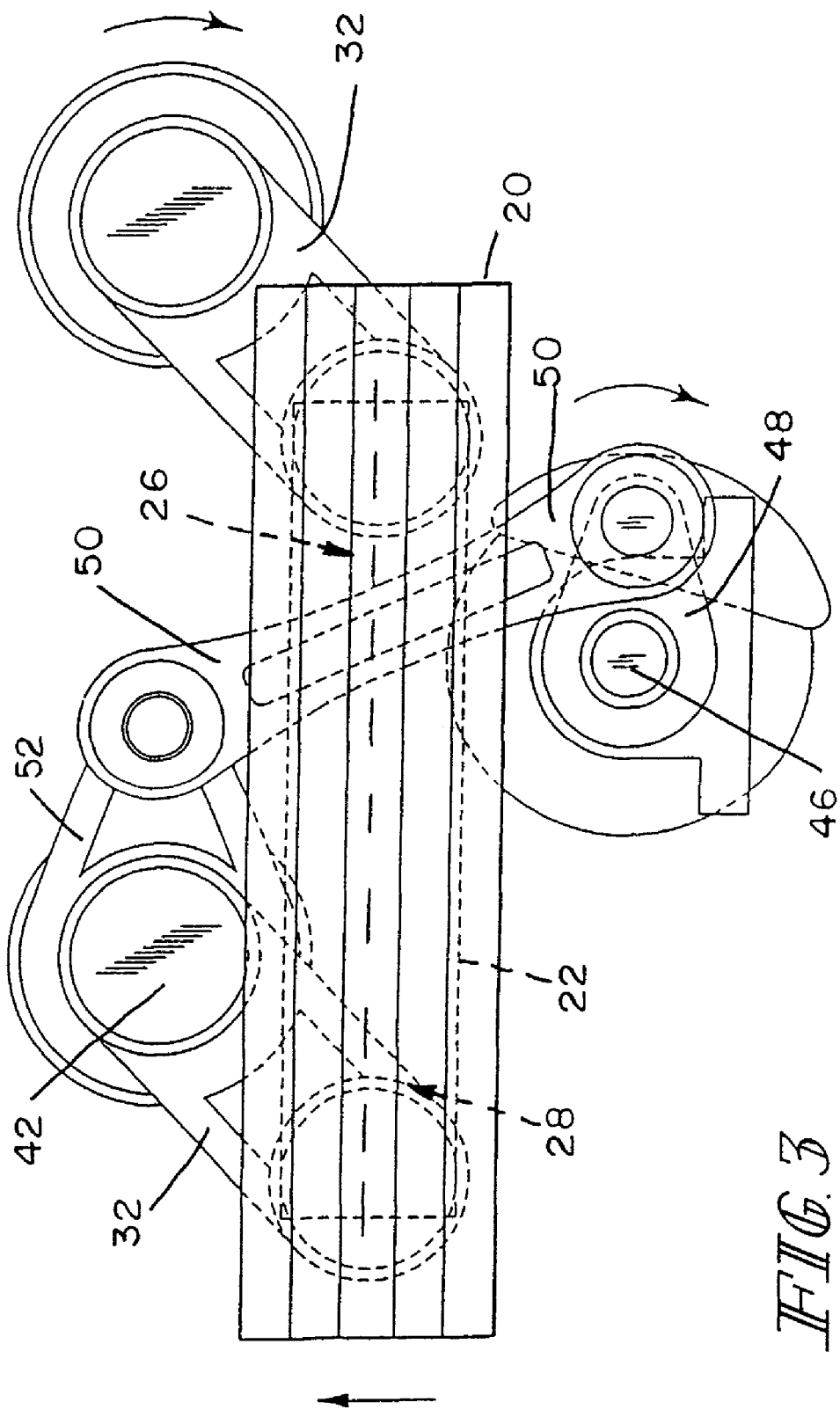
Figure 4:
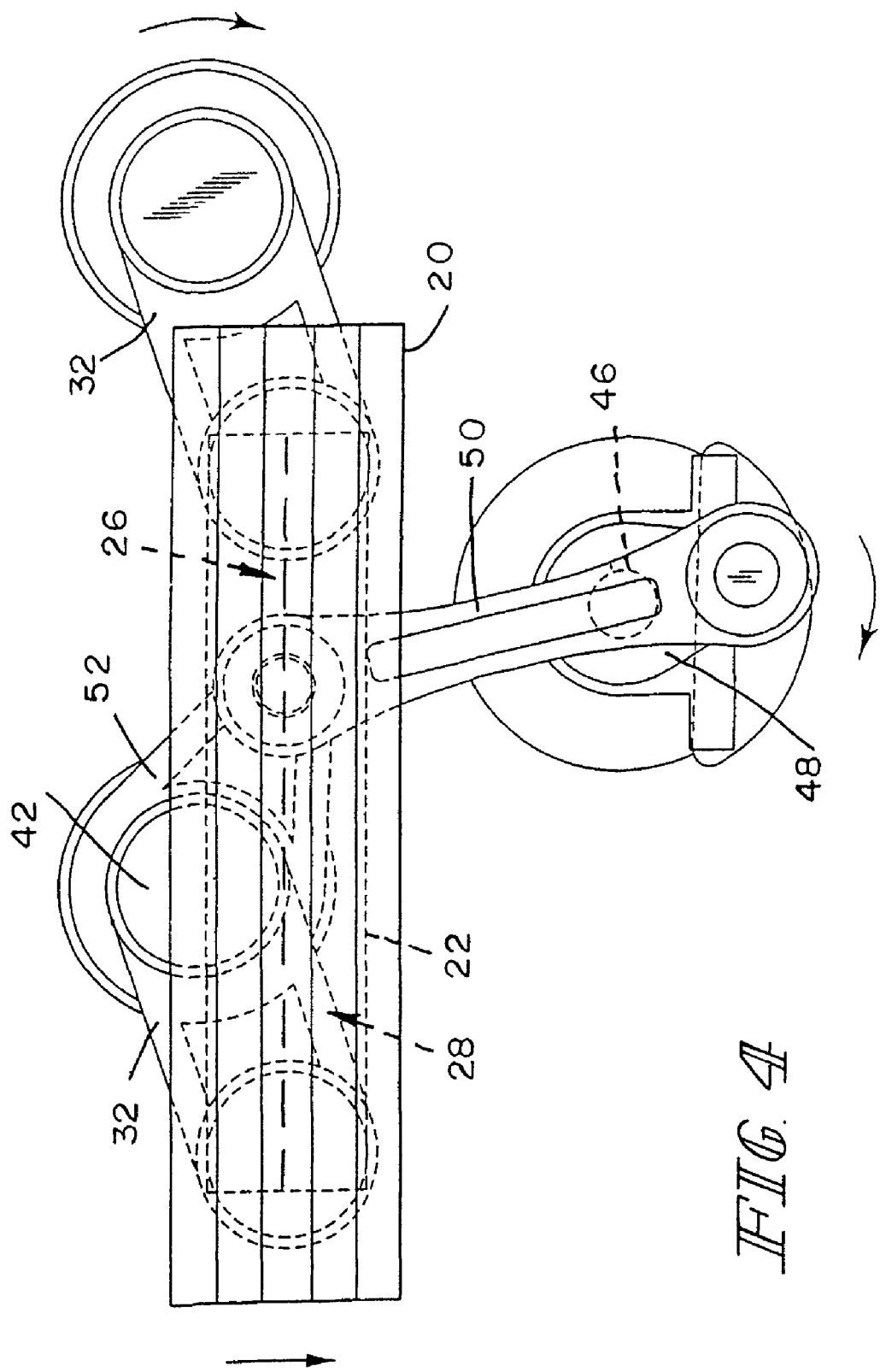

Referring now particularly to FIGS. 2-4, to achieve this motion of the flitch table 20, each flitch table motion arm 32 is pivotally mounted at one end by a pin 38 to a support 40 on which the flitch table 20 is mounted. Each flitch table motion arm 32 is mounted at its other end to a flitch table turning shaft 42 which is pivotally supported in a stationary support framework 44. The stationary support framework 44 also rotatably supports a drive shaft 46 which is appropriately counterweighted 47. Drive shaft 46 includes a crank arm 48, the end of which remote from drive shaft 46 is pivotally coupled to one end of a connecting rod 50. The other end of connecting rod 50 is coupled to a drive lever 52 stationarily connected to one of the flitch table motion arms 32. The rocking motion of the flitch table 20 is thus obtained by rotation of drive shaft 46.

Rotation of drive shaft 46 is achieved by a prime mover 47 (FIG. 1a), for example, an electric motor, typically via a speed reducing transmission including (a) pulley(s) 49 mounted on the output shaft of the prime mover 47, belt(s) 51 trained about the pulley(s) 49 on the output shaft of the prime mover 47 and about (an) input pulley(s) 53 of a clutch-brake combination 55, for example, an air clutch, a clutch-brake combination output shaft 57, (a) drive pulley(s) 59, (a) chain(s) 68, and (a) driven pulley(s) 70 provided on drive shaft 46.

Figure 5:
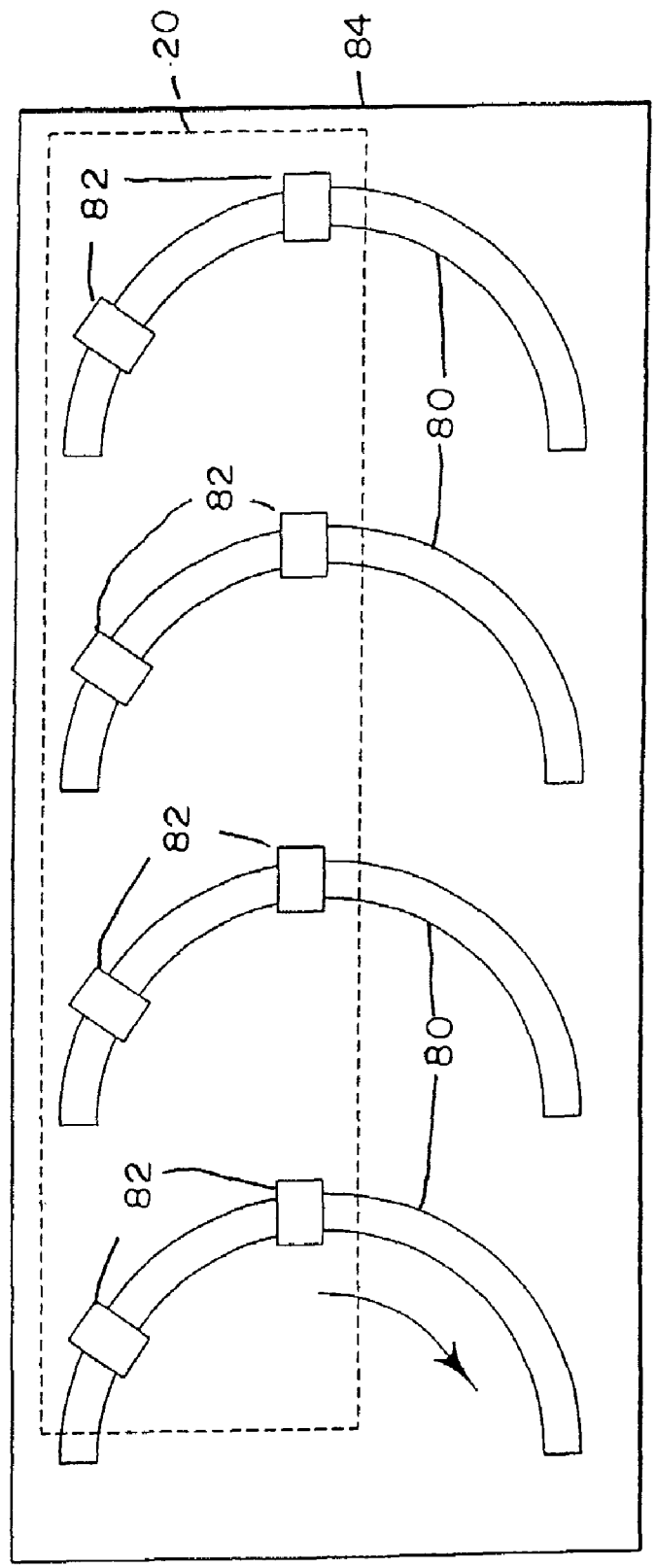
FIG. 5 illustrates an elevational view of certain components of another system constructed according to the invention; and, FIGS. 6-7 illustrate partly broken away elevational views of certain components of another system constructed according to the invention.

Referring now to FIG. 5, because the flitch table 20 moves in an arc 36, if additional support of the flitch table 20 is necessary or desirable, (an) arcuate track(s) 80 and arcuate slide(s) 82 for engaging the arcuate track(s) 80 can be added to the support apparatus 84 for the flitch table 20. The track(s) 80 and track 80-following grooves in the slide(s) 82 would have the same radii of curvature as the effective radius (radii) of flitch table motion arm(s) 32 by which the flitch table 20 is supported on the veneer slicer 23. The slide(s) 82 would be pivotally mounted to the table 20. The slide(s) 82 can, for example, be (a) solid bearing slide(s), or can be provided with ball- or roller-bearings, including circulating ball- or roller-bearings of the type described in, for example, U.S. Pat. No. 6,102,090. Alternatively, such (an) arcuate track(s) 80-and-slide(s) 82 mechanism can provide the sole mechanism for supporting the flitch table 20 for this arcuate movement, and (a) suitable motor(s) pivotally coupled between the flitch table 20 and support apparatus 84 to cause the flitch table to execute the arcuate motion determined by the configuration(s) of such (an) arcuate track(s) 80 and slide(s) 82.

Figure 6:
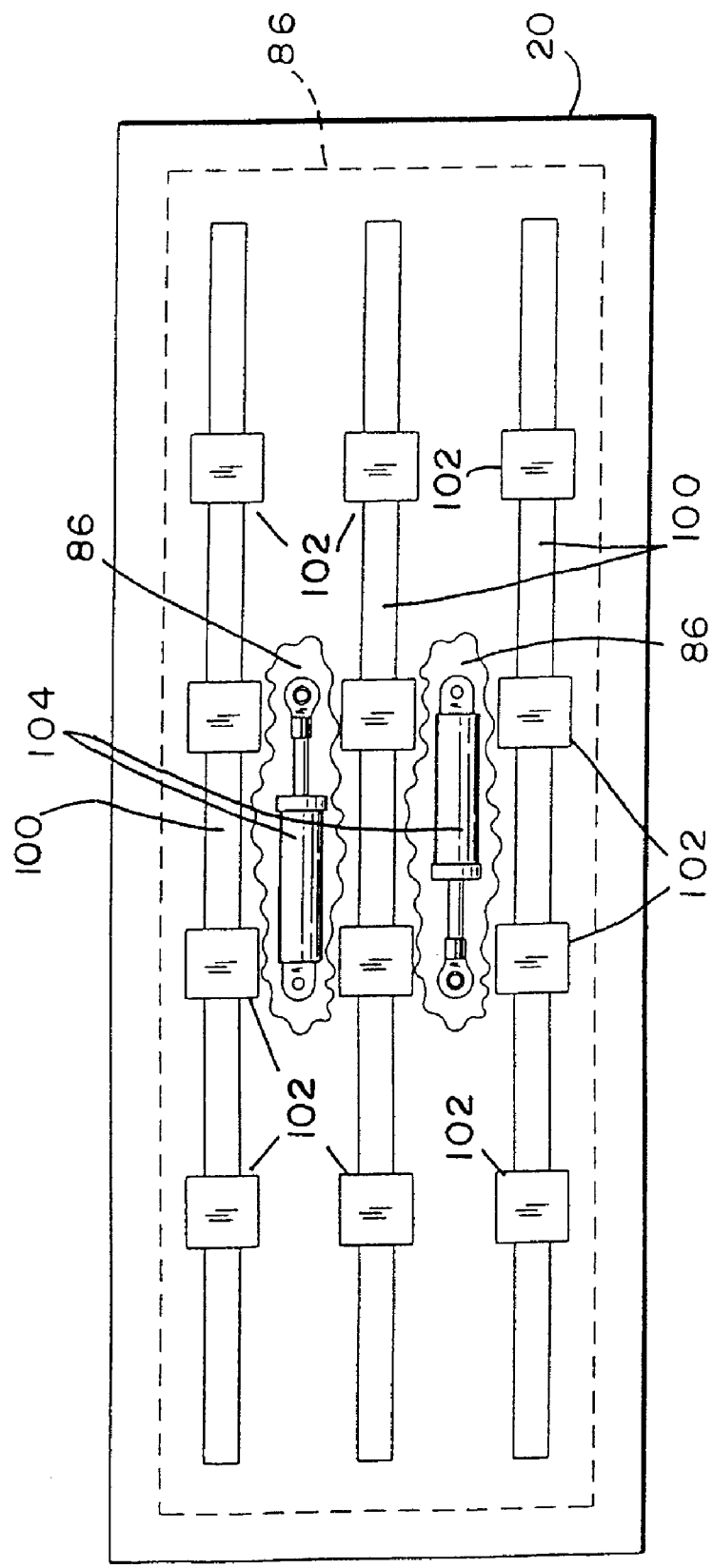
Figure 7:
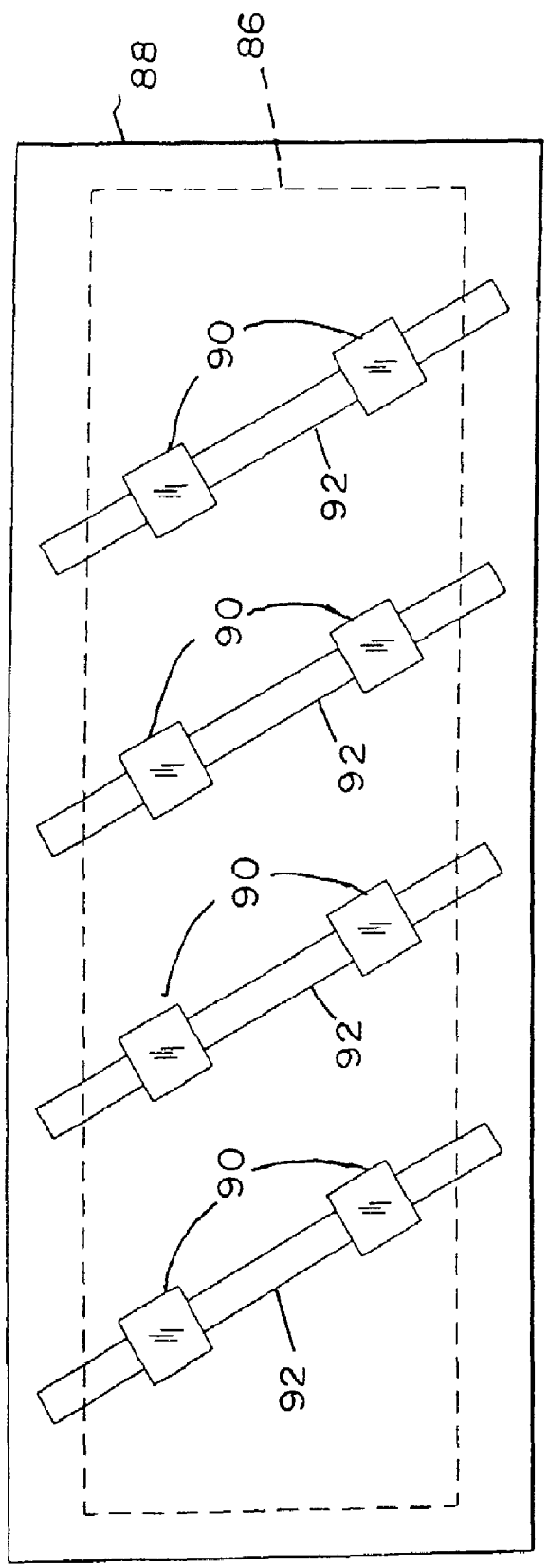

Referring now to FIGS. 6-7, another method for achieving the slower-to-faster slicing motion which permits the execution of even more complex motions is to mount the flitch table support 86 from the supporting framework 88 using conventional means, such as for example, (a) linear track(s) 92 and (a) linear solid bearing- or ball- or roller-bearing slide(s) 90, including circulating ball- or roller-bearings of the type described in, for example, U.S. Pat. No. 6,102,090. The flitch table 20 is then mounted from the flitch table support 86 by, for example, (a) horizontal or generally horizontal linear track(s) 100 mounted on one of the support 86 and table 20 and bearings(s) 102 of the type described in, for example, U.S. Pat. No. 6,102,090 mounted on the other of the support 86 and table 20. Some drive means 104, such as, for example, (a) reversible electric or hydraulic motor(s), is provided between the flitch table 20 and its support 86. Then, as the flitch table support 86 is moved linearly generally vertically, or at an acute angle to vertical, the flitch table 20 can simultaneously be driven horizontally at (a) rate(s) by supplying current to the electric motor(s) or supplying and/or removing hydraulic fluid to and/or from the hydraulic motor(s) 104 according to a suitable algorithm. In this way, any of a number of desired motions of the flitch 22 relative to the knife 24 can be achieved.

What is claimed is:

1. A veneer slicer including a knife, a flitch table for supporting a flitch, and a guide and a follower for following the guide, one of the guide and follower mounted on a supporting framework and the other of the guide and follower mounted on a flitch table support to mount the flitch table support movably relative to the supporting framework, the flitch table mounted from the flitch table support for movement relative to the flitch table support, and at least one motor coupled between the flitch table and the flitch table support for moving the flitch table relative to the flitch table support.

2. The apparatus of claim 1 wherein the guide and follower together include a solid bearing slide.

3. The apparatus of claim 1 wherein the guide and follower together include a slide and bearings.

4. The apparatus of claim 3 wherein the bearings are circulating bearings.

5. The apparatus of claim 4 wherein the bearings are ball bearings.

6. The apparatus of claim 4 wherein the bearings are roller bearings.

7. The apparatus of claim 1 further including a controller for controlling the motor, the controller controlling the motor in accordance with an algorithm.

8. The apparatus of claim 7 wherein the motor includes a fluid motor.

9. The apparatus of claim 7 wherein the motor includes an electric motor.

10. The apparatus of claim 1 wherein the flitch table includes a port for coupling to a vacuum source.

11. The apparatus of claim 1 wherein the flitch table includes dogs actuable between flitch releasing orientations and flitch supporting orientations to mount a flitch to the flitch table.

12. The apparatus of claim 1 further including a carriage for supporting the knife for movement selectively toward and away from the flitch.

13. A method of converting a flitch into sheets of veneer, the method including providing a guide and a follower for following the guide, one of the guide and follower mounted on a supporting framework and the other of the guide and follower mounted on a flitch table support to mount the flitch table support movably relative to the supporting framework, mounting the flitch table from the flitch table support for movement relative to the flitch table support, coupling at least one motor between the flitch table and the flitch table support and actuating the at least one motor for moving the flitch table relative to the flitch table support.

14. The method of claim 13 wherein providing a guide and a follower for following the guide together include providing a solid bearing slide.

15. The method of claim 13 wherein providing a guide and a follower for following the guide together include providing a slide and bearings.

16. The method of claim 15 wherein providing a slide and bearings together include providing circulating bearings.

17. The method of claim 16 wherein providing circulating bearings includes providing circulating ball bearings.

18. The method of claim 16 wherein providing circulating bearings includes providing circulating roller bearings.

19. The method of claim 13 wherein actuating the motor to move the flitch table relative to the flitch table support includes actuating the motor in accordance with an algorithm.

20. The method of claim 19 wherein coupling a motor between the flitch table support and the flitch table includes coupling a fluid motor between the flitch table support and the flitch table.

21. The method of claim 19 wherein coupling a motor between the flitch table support and the flitch table includes coupling an electric motor between the flitch table support and the flitch table.

* * * * *